United States Patent [19]

Tuckey

[11] Patent Number: 4,543,935
[45] Date of Patent: Oct. 1, 1985

[54] PRESSURE REGULATOR WITH VARIABLE RESPONSE

[75] Inventor: Charles H. Tuckey, Cass City, Mich.

[73] Assignee: Walbro Corporation, Cass City, Mich.

[21] Appl. No.: 642,776

[22] Filed: Aug. 21, 1984

[51] Int. Cl.[4] .............................................. F02M 37/04
[52] U.S. Cl. ..................................... 123/463; 123/459; 137/510
[58] Field of Search .............. 123/463, 465, 459, 457; 137/510; 251/61.1

[56] References Cited

U.S. PATENT DOCUMENTS

| | | | |
|---|---|---|---|
| 1,955,037 | 4/1934 | Viel | 123/463 |
| 2,426,153 | 8/1947 | Mock | 123/463 |
| 2,441,948 | 5/1948 | Atkinson | 123/463 |
| 2,576,475 | 11/1951 | Perrine | 123/463 |
| 2,673,556 | 3/1954 | Reggio | 123/463 |
| 3,487,820 | 1/1970 | Clark | 123/463 |
| 4,300,510 | 11/1981 | Ishida et al. | 123/463 |
| 4,458,650 | 7/1984 | Kessler et al. | 123/463 |

*Primary Examiner*—Magdalen Y. C. Moy
*Attorney, Agent, or Firm*—Barnes, Kisselle, Raisch, Choate, Whittemore & Hulbert

[57] ABSTRACT

A pressure regulator valve for use in fuel systems for internal combustion engines utilizing super-chargers for air supply which includes a three-part housing lamination with separate upper and lower diaphragms between the bottom and top housings and the intermediate housing. The lower diaphragm is responsive to fuel pressure and will open a valve to by-pass fuel to a fuel tank. The upper diaphragm is exposed to the pressure of super-charged air to resist the opening of the fuel by-pass valve. The effective areas of the upper and lower diaphragms is designed to have a ratio of about 4 to 1. An adjustable air by-pass valve is provided to adjust the air pressure acting on the upper diaphragm to permit ratio adjustment of the air pressure reaching the regulator to the fuel pressure reaching the engine, for example, a fuel injector leading to the engine.

5 Claims, 1 Drawing Figure

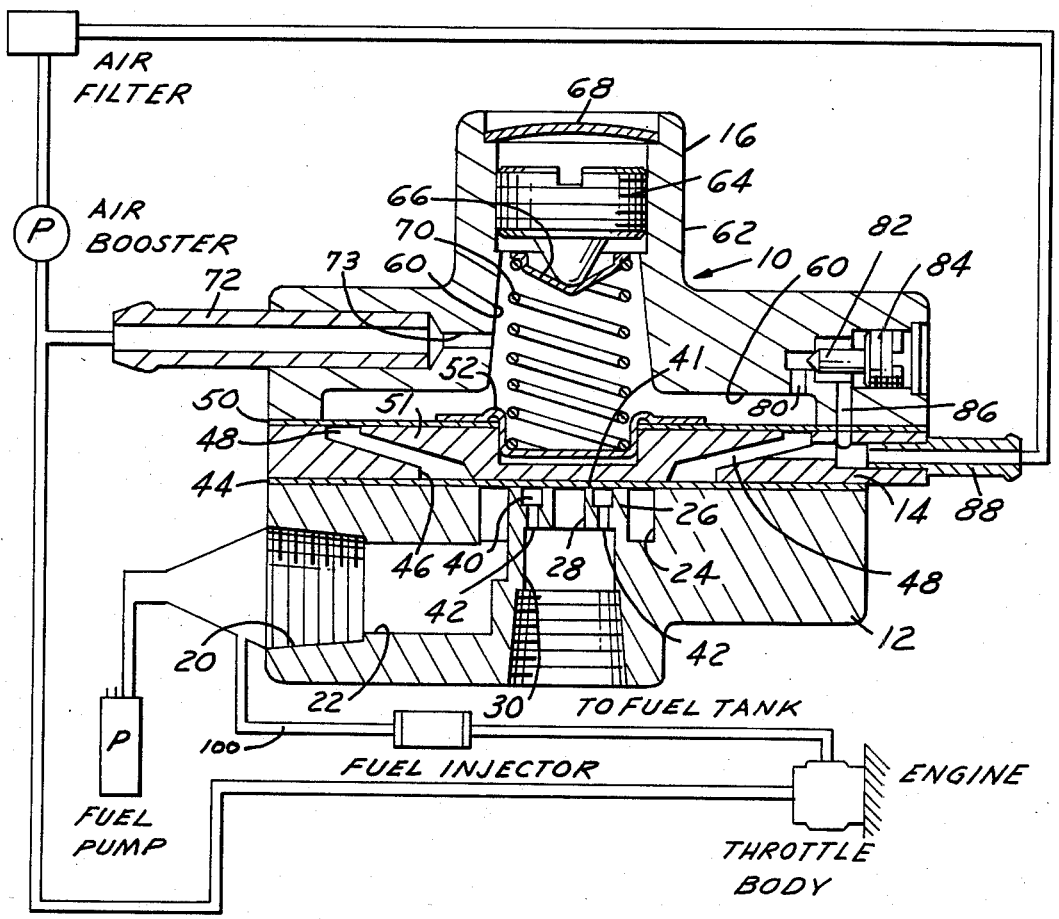

PRESSURE REGULATOR WITH VARIABLE RESPONSE

FIELD OF INVENTION

Fuel systems for internal combustion engines with supercharger.

BACKGROUND OF INVENTION

Constant pressure regulator valves have been utilized in fuel systems for quite some time. However, when an engine is used with an air intake supply which is higher than ambient atmospheric pressure, a standard pressure regulator will not always supply fuel pressure to match the increased air density. It is an object of the present invention to provide a pressure regulator for a fuel system which can be used with super-chargers or turbo-chargers in the system which boost the air pressure and, consequently, the density of the air being furnished to the engine to mix with the hydrocarbon fuel. Since the air pressure devices to boost the air pressure are usually driven by the engine itself, the speed and thus the effectiveness of the super-charging will increase with the speed of the engine.

It will be appreciated that the higher the pressure of the air being furnished to the engine, the higher must be the pressure of the fuel in order that it may be introduced into the carburetion system in sufficient quantities to provide the proper mixture of air and hydrocarbon fuel.

In fuel injection systems, the time period of the fuel injector valve may vary with the speed and under certain load conditions. However, it is not sufficient merely to raise the fuel pressure by the same amount as the air pressure. The fuel pressure must be raised in a higher ratio to insure that a sufficient quantity of fuel is delivered during the open period of the injector valve to match the increase in density of the incoming air.

The present invention is directed to a fuel pressure regulator which is designed to compensate for increase in the pressure and density of the incoming air and supply the required quantity of fuel for an effective fuel-air mixture.

Numerous objectives and features of the invention will be apparent in the following specification and claims in which the invention is described together with details to enable persons skilled in the art to practice the invention, all in connection with the best mode presently contemplated for the invention:

BRIEF DESCRIPTION OF THE DRAWINGS

A DRAWING accompanies the disclosure and the single view thereof may be briefly described as:

A vertical sectional view of the fuel regulator showing the various parts and passages.

DETAILED DESCRIPTION OF THE INVENTION AND THE MANNER AND PROCESS OF USING IT

The pressure regulator in the drawing is shown in a diagrammatic circuit including a fuel pump, an air booster with filter, and a throttle body mounted on an engine. The trend in present day automotive design is high performance engines which utilize fuel pumps to deliver fuel to a fuel injection system under pressure. Also provided are devices for increasing the pressure and density of the air to be delivered to the engine. A super-charger is provided in the form of a power device by the vehicle engine for increasing air pressure, or a turbo-charger may be used in which the device for increasing the air pressure is driven by the exhaust gases of the engine. It will be recognized that the faster the engine speed, the higher will be the booster pressure and density of the air being delivered to the throttle body of the fuel injection device. In this description the term "super-charger" may include the turbo-charger systems.

The pressure regulator to be described is to be located between the fuel pump and throttle body injector and the boost air is supplied at a location between the air charger and the throttle body air inlet.

In the drawing, a pressure regulator 10 is composed of three body parts including a base housing 12, an intermediate plate 14, and a top housing 16. These parts are suitably joined by bolts or screws which transfix the parts.

The base housing 12 is a flat part having a fuel entry part 20 with a radial passage 22 opening to an annular fuel chamber 24 within which is a small turret 26 with a central port 28 opening into a passage 30 which has a tapped portion to connect to a fuel return conduit leading to the fuel tank of the vehicle.

The turret 26 has a flat top surface with two diaphragm seats formed by an annular groove 40 within an annular seat 41. The groove 40 opens to the passage 30 through ports 42.

Above the bottom housing 12 and extending across the flat top surface is a first diaphragm 44. This diaphragm is sandwiched between the housing 12 and the intermediate plate 14. Plate 14 has a wide conical recess 46 open to the diaphragm 44 and widening at 48. Diaphragm 50 overlies the flat top of plate 14. Between the diaphragms 44 and 50 is a valve back-up plate 51. The back-up plate 51 also has a depression centrally of the top surface to serve as a locator for a spring seat disc 52 with a cup-like depression to register with the depression in plate 51. The annular rim of disc 52 seats on the inner periphery of the diaphragms 50.

Overlying the diaphragm 50 is the top plate 16 which has a chamber 60 exposed to the diaphragms 50. The chamber 60 rises centrally within a dome portion 62 which contains an adjustable threaded plug 64 having a conical projection to be received in conical depression in a spring seat 66. A Welch plug 68 closes the dome 62 to seal the opening and prevent tampering with the adjustment screw.

The passage 60 in dome 62 houses a compression spring 70 seated at disc 52 and seat 66. This passage 60 also opens to a side connector 72 through a calibrated orifice 73 which is open to the pressure generated in the air booster whether it be a super-charger or a turbo-charger.

The effective area of the diaphragm 50 is preferably about three to four times the effective area of the diaphragm 44.

Also shown in the drawing is an adjustable air vent passage 80, the effective area of which is controlled by valve element 82 on threaded plug 84. An outlet vent passage 86 is open to a vent connector 88 which opens to the air cleaner of the carburetor system ahead of, that is, upstream of the turbo-charger.

It will be noted that the central portion of diaphragm 50 is retained against the back-up plate 51 by the rim of the spring seat disc 52. Also, the depressed portion of this disc drops into the depression in plate 51 to locate the disc 52. The spring 70 thus seats well below the surface of the plate 51 to establish a stable assembly and reduce the tendency to rock.

In the operation of the embodiment in the drawing, the pressure of fuel from the fuel pump acts on the diaphragm 44 at the annular fuel chamber 24 to lift the diaphragm 44 and the valve back-up plate 51 which will bypass fuel to the tank outlet 30. Pressure from the turbo-charger passage 72 acts on the diaphragm 50 above the valve plate 51 through the calibrated orifice 73. The spring force of spring 70 is first adjusted by screw plug 64 to give a desired fuel pressure in chamber 24 at an ambient atmosphere pressure in chamber 60. Then boost air pressure is introduced into fitting 72 and the valve 82 is adjusted to give the desired boost fuel pressure in chamber 24. For example, if the boost air pressure is 10 p.s.i., then the fuel pressure is adjusted to a ratio above this to, for example, a 30 p.s.i. increase over the adjustment at ambient pressure. The pressure regulator will establish a defined ratio once regulated. For example, if the boost pressure is increased to 11 p.s.i., the fuel will be delivered at 33 p.s.i. above the adjusted rate at ambient pressure or conversely. If a 2½ to one ratio is desired, this can also be established by adjustment of valve 82.

With these adjustments the regulator is ready for use. The effective area of diaphragm 50 relative to the effective area of diaphragm 44 is designed to provide a ratio of three-to-four to one. The result is that the fuel pressure delivered to the fuel injector through passage 100 can be adjusted (by adjustment of valve 82) so that the ratio of the desired fuel pressure increase relative to the boost air pressure increase can be established in a range from close to one-to-one ratio to as high as 4 to 1 ratio. This will depend on the injector function. In most cases, this device is useful when fuel is delivered by a fuel injector to a throttle body which is delivering fuel to multiple cylinders.

It will be appreciated that in addition to the ratio range accomplished by the double diaphragm structure, the second diaphragm 50 also serves as a center locator for the plate 51 to locate the plate 51 in the seating area.

What is claimed is:

1. In a fuel supply system for an internal combustion engine in which is provided:
    (a) a source of fuel under pressure,
    (b) a means for introducing fuel into the internal combustion engine,
    (c) a pressure booster for air to be furnished to said means, and
    (d) a pressure regulator having pressure responsive means subject to fuel pressure from said source and to air pressure from said pressure booster to provide an air-to-fuel pressure ratio of fuel and air furnished to said means to compensate for the increased density of air resulting from the air boost pressure,
    said pressure regulator comprising:
    (1) a housing having a fuel inlet and a fuel by-pass outlet,
    (2) a valve between said inlet and outlet to open and close said outlet,
    (3) a first diaphragm responsive to fuel pressure to control the opening and closing of said valve,
    (4) resilient means biasing said valve to a closed position, and
    (5) a second diaphragm in said housing responsive to super-charged air pressure also to bias said valve in the same direction as said resilient means,
    the effective area of said diaphragms acting on said valve being in a ratio wherein the effective area of the second diaphragm is significantly larger than the effective area of said first diaphragm.

2. A pressure regulator as defined in claim 1 in which an adjustable air by-pass is provided in the housing to regulate the amount of air pressure from said supercharger effective on said second diaphragm.

3. In a fuel supply system for an internal combustion engine in which is provided:
    (a) a source of fuel under pressure,
    (b) a means for introducing fuel into the internal combustion engine,
    (c) a pressure booster for air to be furnished to said means, and
    (d) a pressure regulator having pressure responsive means subject to fuel pressure from said source and to air pressure from said pressure booster to provide an air-to-fuel pressure ratio of fuel and air furnished to said means to compensate for the increased density of air resulting from the air boost pressure,
    said pressure regulator comprising:
    (1) a valve for by-passing fuel from the source of fuel under pressure,
    (2) a first diaphragm acting on said valve to open said valve in response to fuel under pressure from said source, and
    (3) a second diaphragm acting on said valve to close said valve in response to pressure from said air pressure booster, means forming a control chamber adjacent said second diaphragm, means forming a calibrated orifice to admit air to said chamber from said pressure booster, said diaphragms having pressure responsive areas in a ratio wherein the effective area of the second diaphragm is significantly larger than the effective area of said first diaphragm, and an adjustable air outlet orifice leading from said chamber to permit adjustment of said ratio of effective areas to a particular fuel system.

4. A fuel supply system as defined in claim 3 in which said valve for by-passing fuel is positioned between said first and second diaphragms, said valve having a depressed recess on the side facing the second diaphragm, a diaphragm retainer cup having a rim portion to overlie a central portion of said second diaphragm to clamp it on said valve, and a cupped portion to fit into said depressed recess, and a coil spring seated in said cupped portion of said retainer to bias said diaphragm in the direction to close said valve.

5. In a fuel supply system for an internal combustion engine, said system including a fuel tank, a source of fuel under pressure, a source of air at super atmospheric pressure, and a means for introducing fuel and air into the internal combustion engine, that improvement which comprises:
    (a) a pressure regulator housing having a pressure responsive diaphragm means,
    (b) a fuel control valve responsive to movement of said diaphragm means to open said valve to by-pass fuel to the tank,
    (c) means to conduct fuel from said fuel pressure source to one side of said diaphragm means, (d) means to conduct air pressure from said air source to a chamber in the housing on the other side of said diaphragm means, (e) passage means in said housing on said other side of said diaphragm to by-pass air from said housing, and (f) adjustable means in said passage means to regulate the amount of air from said air source in said chamber effective on said other side of said diaphragm means.

* * * * *